United States Patent [19]

Casaly

[11] 4,230,265
[45] Oct. 28, 1980

[54] ADAPTIVE THRESHOLD OPTICAL READER

[75] Inventor: Richard J. Casaly, Santa Monica, Calif.

[73] Assignee: Transaction Technology, Inc., Los Angeles, Calif.

[21] Appl. No.: 36,686

[22] Filed: May 7, 1979

Related U.S. Application Data

[63] Continuation-in-part of Ser. No. 943,201, Sep. 18, 1978.

[51] Int. Cl.³ .................. G06K 7/14; G08C 9/06; G06K 9/00
[52] U.S. Cl. .................. 235/455; 235/459; 250/555; 340/146.3 AG
[58] Field of Search .......... 235/454, 455, 458, 459, 235/462, 463; 340/146.3 AG; 250/555

[56] References Cited

U.S. PATENT DOCUMENTS

| 3,675,201 | 7/1972 | McKissick et al. | 340/146.3 AG |
| 3,692,983 | 9/1972 | Cucciati et al. | 340/146.3 AG |
| 3,778,768 | 12/1973 | Brisk et al. | 340/146.3 AG |
| 3,833,833 | 9/1974 | Haupt et al. | 340/146.3 AG |

*Primary Examiner*—Daryl W. Cook
*Attorney, Agent, or Firm*—Charles H. Schwartz

[57] ABSTRACT

An adaptive threshold optical reader for detecting optically encoded information when positioned within an optical path, including a light source for producing light energy along the optical path, a light detector responsive to the light energy along the optical path and for producing an ouput signal in accordance with the light energy detected by the light detector, means responsive to the output signal from the light detector and with the means having at least two states and with the means in a first state producing an adaptive threshold signal when there is no optically encoded information positioned within the optical path and with the adaptive threshold signal representative of the output signal from the light detector with a threshold level of optically encoded information and adaptive to optical changes and with the means in a second state for producing an information signal representative of the output signal from the light detector when there is optically encoded information positioned within the optical path, means responsive to the adaptive threshold signal for storing the adaptive threshold signal, and means responsive to the stored adaptive threshold signal and the information signal for detecting the presence of optically encoded information in the information signal above a threshold level in accordance with the stored adaptive threshold signal.

21 Claims, 6 Drawing Figures

ADAPTIVE THRESHOLD OPTICAL READER

This is a continuation-in-part of application Ser. No. 943,201 filed Sept. 18, 1978, and entitled "Adaptive Threshold Optical Reader".

The present invention is directed to an adaptive threshold optical reader. In particular, the optical reader of the present invention provides for the detection of optical encoding such as on a credit card. In the present invention the threshold for detecting the presence or absence of optically encoded information is adaptive to compensate for component tolerances and for changes in component values with the passage of time and for changes in the optical path with the passage of time.

Optical readers are used to detect optically encoded information which may be encoded in various forms. For example, a data card may have holes punched in the card and with the presence or absence of a hole representative of encoded information. Other types of optically encoded information include the use of areas having a greater or lesser optical attenuation than the surrounding area. For example, credit cards have been constructed including areas or dots of high optical attenuation sandwiched inside the credit card. In this way, the optically encoded information is obscured from view but the information may be read out using an optical reader since the optical attenuation in the areas having an increased optical attenuation can be distinguished from the other areas.

In particular the encoding may be formed from printed dots of greater optical density. As a specific example, credit cards may exhibit an optical attenuation of no more than 1,000 x through the base material of the card and at least 10,000 x through the base material and the dots representing encoded information. It is, therefore, possible to detect the presence or absence of these dots of optically encoded information by measuring the optical attenuation through the credit card and by setting an absence or presence threshold between the 1,000 x and 10,000 x attenuation levels.

There are a number of factors which enter into the establishing of the threshold level, such as between the upper and lower attenuation levels. For example, in a typical optical reader, light output may be provided by a light emitting diode (LED) and may be detected by a photodiode. In addition, the light path between the LED and photodiode may include transparent card guides and other physical structures which maintain the card and optical components in a desired position for detection. With prior art readers the various components must fall within or be adjusted to particular tolerances and must maintain these tolerances during the operation of the card reader in order to ensure an accurate detection of the presence or absence of the optically encoded information. Generally two prior art methods have been used in order to provide for the initial setting of the threshold level, but the problem of component degradation and other physical changes in the reader have normally not been provided for in the prior art.

As a first example of the prior art, the initial threshold level may be established at a fixed value and the various components such as the LED's, photodiodes, card guides, etc. would be specified to be within certain optical tolerances the sum of which would not exceed the ratio between the upper and lower attenuation levels. For example, if the levels were 1,000 x and 10,000 x, then the sum of the different tolerances could not exceed a ten to one ratio. The actual desired threshold level would be a level between 1,000 x and 10,000 x wherein the widest possible changes in component values in either direction would provide for a threshold level still within the extremes.

Using the example of 1,000 x and 10,000 x, the desired level is approximately 3162 x, since this represents a threshold level wherein a change in component values can have a factor as large as 3.162 in either direction and still be within the original upper and lower attenuating levels. This can be seen since the change in the optical threshold of 3162 x with a multiplication factor of 3.162 equals 10,000 x. Similarly the change in the optical threshold of 3162 x with a division factor of 3.162 equals 1,000 x. It is to be appreciated that other threshold levels can be chosen if the upper and lower levels are different or if it is known that the components tend to change in one direction more than another. The particular threshold level which is optimum therefore can be chosen in accordance with the specific requirements.

Another prior art method of constructing an optical reader would be to initially purchase the various component parts to looser specifications. During the final test of the optical reader an adjustment is made so that the threshold level is actually adjusted to the desired value. For example, one or more components may be adjustable or one or more components may be replaced or modified so as to provide for a desired threshold level.

Although it is possible, as described above, to provide for some control of the initial threshold level owing to variations in the component parts, this control does not account for threshold changes in the reader with time such as component degradations with time, and temperature and with other optical variations which may provide for changes in the threshold level of the reader.

The present invention provides for an adaptive threshold optical reader which provides for automatic compensation of the threshold level due either to variations in the initial component tolerances and also for variations due to component degradations with time and temperature and due to wear and tear on the optical reader.

The adaptive threshold optical reader of the present invention operates by providing for a constant monitoring of the output signal from the photo detector during the time that there is no card inserted into the reader. During this time the output from the photo detector is continuously adjusted to provide for a threshold level in accordance with a predetermined level. If any of the components such as the light source, the card guide or the light detector change with time or vary with temperature or have their optical properties changed because of wear and tear, the threshold value is then adapted to maintain the desired threshold level.

The adaptive threshold device of the present invention includes continually adapting the output from the device when there is no card being read and with the level of the output controlled in accordance with a ratio of resistances which provides for the desired threshold. As the various components change or have undesired tolerance variations, the threshold level is adjusted in accordance with these changes but in comparison to the desired ratio of resistances. The threshold level would therefore be constantly adjusted to account for any component variations, including the resistors so long as the ratio of resistances is maintained.

The threshold level is stored and as soon as a card is inserted in the reader to provide for the detection of information, the stored threshold level is used as the threshold to provide for the detection of the encoded optical information. The continuous monitoring of the threshold level is disengaged during the reading period so that the card is always read using a threshold level which has been monitored just prior to the card being inserted. When the card is removed, the system again monitors the output signal which is controlled by the values of the various components and provides for a setting of a threshold level in accordance with the monitoring of the output signal.

The actual threshold level may be stored as an analog signal through the use of a capacitive storage and with a voltage representing the threshold level stored across a capacitor and used as an input signal to a comparator. As an alternative, the threshold level may be converted to a digital signal and stored in a microprocessor and with the microprocessor itself not only storing the threshold level but providing for a comparison between the stored threshold and the information read from the card.

A clearer understanding of the invention will be had with reference to the following description and drawings wherein FIG. 1 illustrates a basic optical reader and including a fixed threshold level;

Figure 5:
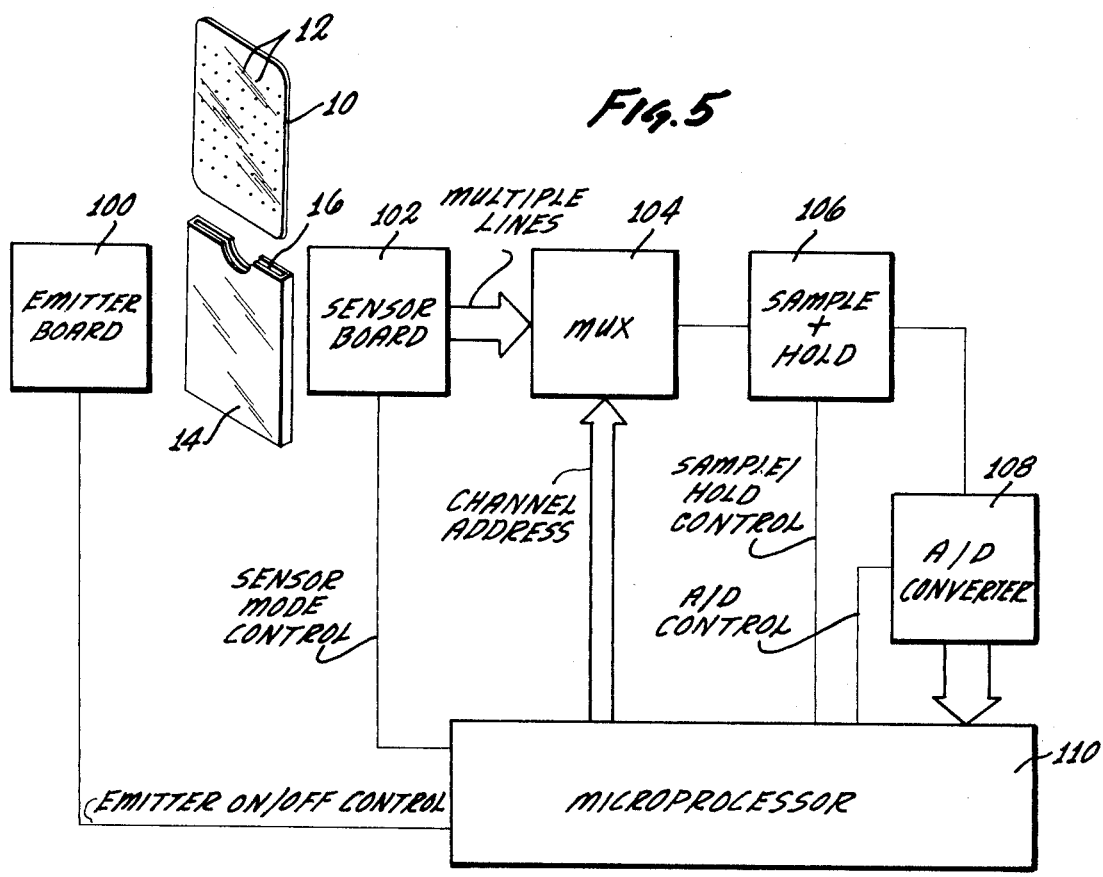
Figure 6:
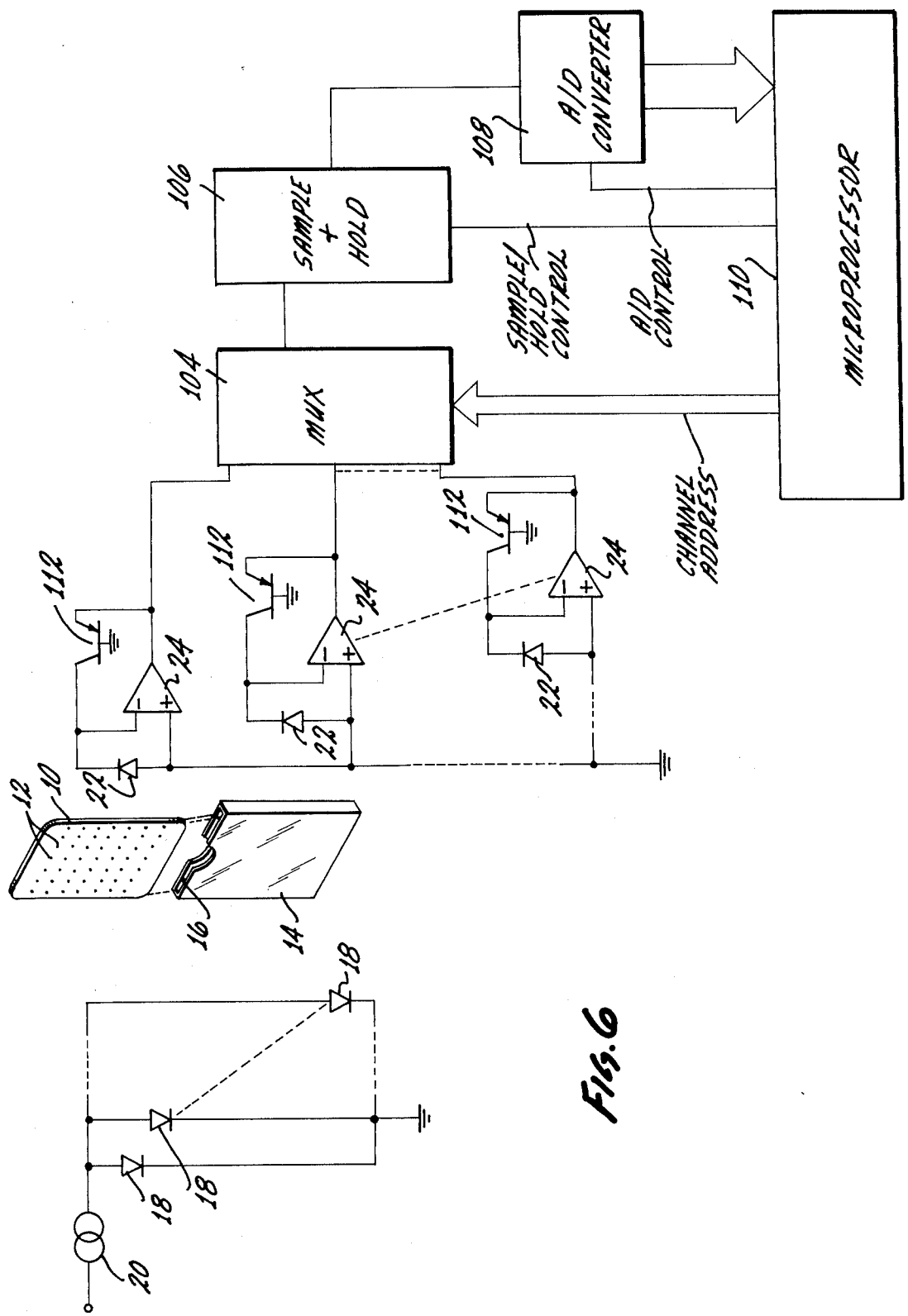

FIG. 5 illustrates a microprocessor controlled configuration for use with the second embodiment of the invention and providing for control of a plurality of sensor channels; and FIG. 6 illustrates a third embodiment of the adaptive threshold optical reader of the present invention incorporated with the microprocessor controlled configuration of FIG. 5 and using a feedback element forming a variable resistor.

Figure 1:
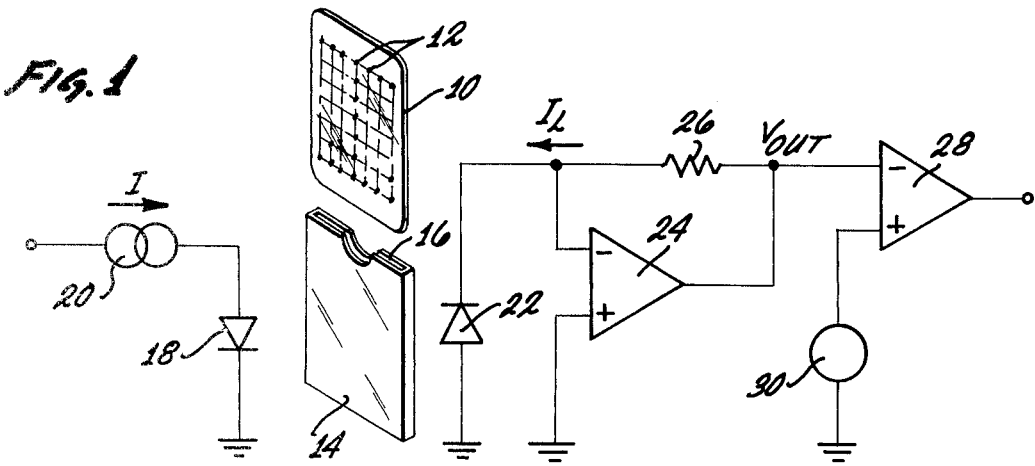

In FIG. 1, a basic optical reader is shown to provide for a reading of a card having optically encoded information such as a credit card 10 having areas 12 of high optical attenuation. The areas 12 of high optical attenuation are shown to lie along parallel tracks. It is to be appreciated that when a plurality of such parallel tracks are used, an appropriate number of light sources and sensors corresponding to the tracks are also used. The plurality of tracks of optical information may provide for coding of information on the credit card 10.

The areas of high optical attenuation 12 may be formed as dots and may be visible to an observer of the card or may be sandwiched within the card and therefore not visible. Normally, a card such as a credit card 10 may exhibit an optical attenuation of no more than a 1,000 x through the base material and with an attenuation of at least 10,000 x through the base material and an individual area or dot 12. Therefore, the absence or presence of the dots 12 can be detected by measuring the optical attenuation through the card and setting a threshold representative of the presence or absence of the dot between an attenuation of 1,000 x and 10,000 x.

As shown in FIG. 1, when the card 10 is to be read it is inserted into a card guide 14 which includes a slot 16 to receive the card and wall members to guide the card through positions for reading the optically encoded information on the card. The wall portions of the card guide 14 are constructed of transparent material so that light energy used in providing for the detection of the optically encoded information may pass through the wall portions and through the card 10.

The optical card reader would normally include light sources such as represented by a single light emitting diode (LED) 18 for providing light energy. It is to be appreciated that a plurality of such LEDs may be used depending upon the number of tracks of information. Also additional LEDs may be used for detecting the initial presence of a card 10 in the card guide 12 and other LEDs may be used for other purposes such as clocking purposes. Each LED 18 would be supplied with energy such as from a current source 20 to provide for the light output from each LED 18.

Light energy from each LED 18 is detected by a light detector such as a photodiode 22 and it is to be appreciated that for each LED 18 there would be a complementary photodiode 22. The output from each photodiode 22 is connected to an operational amplifier 24 and with the operational emplifier connected in the transimpedance configuration so as to provide for a current to voltage conversion. Generally, in this configuration, negative feedback forces the photodiode output current through a feedback resistor 26 while maintaining zero volts across the photodiode. The output voltage from the operational amplifier is proportional to the photodiode output current according to the equation $V_{OUT} = I_L \times R_F$ where $V_{OUT}$ equals the voltage at the output of the operational amplifier, $I_L$ equals the current through the photodiode and $R_F$ equals the resistance of the feedback resistor 26.

If an optical attenuating medium such as the card 10 including the dots 12 of the type described above is placed between the light source 18 and the light sensor 22, the output voltage is reduced in proportion to the optical attenuation of the card or the card plus the optical information 12. Thus, if we define $V_O$ as the no-card output voltage then $V_O/1,000$ and $V_O/10,000$ are the upper and lower threshold limits for determining the absence or presence of the dots 12 of optical information.

The output voltage from the operational amplifier 24 may be applied as one input to a comparator 28. The comparator has a second input a voltage $V_{th}$ from a threshold voltage source 30. The threshold voltage $V_{th}$ is normally chosen to be at a value between the upper and lower threshold limits for determining the presence or absence of dots 12 of optical information. Therefore, the output state of the comparator 28 indicates the presence or absence of dots 12 of optical information.

In order to construct an optical reader as shown in FIG. 1, the threshold voltage must have a fixed value and this fixed value will be determined by the tolerances for the various components which are part of the optical system. Specifically, in a first prior art method the LEDs, photodiodes and card guides all must be within certain optical tolerances and in our specific example, the sum total of these tolerances cannot exceed a 10 to 1 ratio which is the ratio between the upper and lower threshold limits of 1,000 x and 10,000 x. It can be appreciated that the initial component tolerances must be fairly strict or the actual initial threshold level can be considerably different than the desired threshold level.

A second prior art method of initially adjusting the optical reader is to use components with looser tolerances but then to provide for some adjustment of the components to provide a threshold level of a desired value. As was indicated above, a level of 3162 x is approximately the half-way point for attenuations of 1,000 x and 10,000 x and for changes in the tolerances by the same multiple in either direction.

Unfortunately, both prior art methods do not account for degradations of component values that occur with time. Even though it is possible, using the methods described above, to provide for a desired initial threshold level for the reader, the passage of time and changes in temperature and the normal wear and tear, will provide for changes in the various components. These changes in the components will provide for a different and perhaps undesirable threshold level for the optical reader. The present invention, therefore, provides for a constant monitoring of an output threshold signal when there is no card in the reader so as to provide for a constant adjustment of the threshold level with changes in the components or with changes in the optical path.

Figure 2:
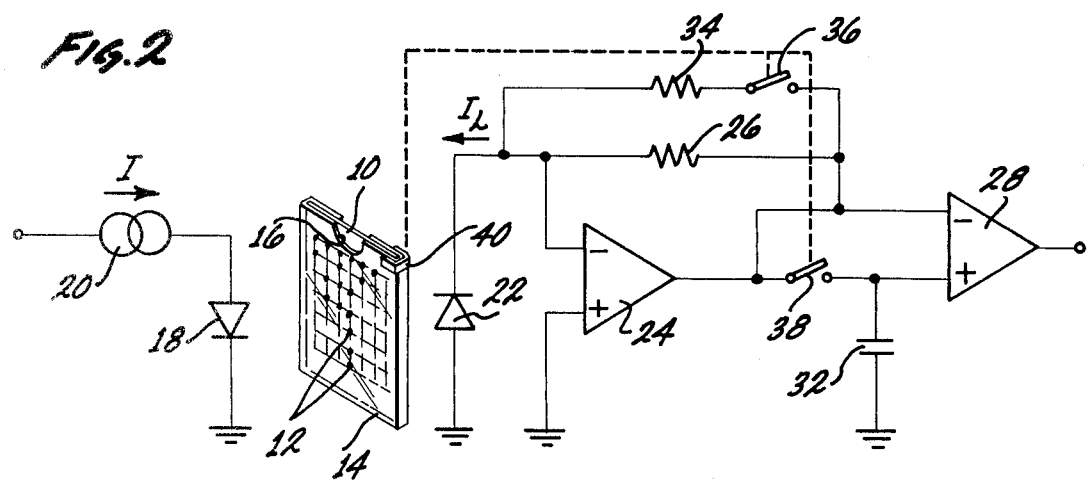
FIG. 2 illustrates a first embodiment of an adaptive threshold optical reader constructed in accordance with the teachings of the present invention and including a storage of an analog level for the adaptive threshold.

In the first specific example of an optical reader shown in FIG. 2, various components which are substantially the same as those in FIG. 1 are given the same reference characters. In the optical reader of FIG. 2, the photodiode 22 is preferably a silicon photodiode which is operated in the short circuit photovoltaic mode. In this mode of operation, the photodiode 22 will generate an output current that is proportional to the light power incident upon the active area of the photodiode. Since the output current is proportional or linear, this characteristic provides for an output current that is proportional to changes in the various component characteristics. In this way the output voltage from the operational amplifier 24, which is in accordance with the output current, may be used to set and maintain a proper threshold level for the comparator 28.

Specifically, the threshold level for the comparator 28 may be stored across a capacitor 32. An input to the capacitor 32 is provided from the output from the operational amplifier 24 when the amplifier is operated in a specific mode. In particular, a second resistor 34 in series with a switch 36 is placed in parallel across the feedback resistor 26. A second switch 38 is linked with the switch 36 so that both are opened and closed at the same time. When the switches 36 and 38 are closed, the output from the operational amplifier 24 is applied across the capacitor 32 and this voltage level is therefore stored by the capacitor. When the switches 36 and 38 are opened, the comparator 28 provides a detection of optical information and with this detection in accordance with the threshold level stored across the capacitor 32.

In order to provide for the threshold level to be adaptive so as to account for component tolerances and component degradations, the level should be adjusted to always be at a desired level no matter what tolerances or degradations occur in the components. Generally, the circuit of FIG. 2 provides for a threshold level to be stored in the capacitor 32 with no card in the reader, and with this threshold level to be representative of a particular optical attenuation such as an attenuation of 3162 x.

For example, in the circuit of FIG. 2, if the switch 36 is open, then the operational amplifier output voltage represents $V_{OUT}=I_L \times R_F$. If $I_O$ is the output current of the photodiode when there is no card in the reader and with the switch 36 open, then $I_O/3162$ would be the threshold output current for a desired threshold level and in addition $V_{OUT}=I_O/3162 \times R_F$. We can therefore achieve the desired threshold output voltage $V_{OUT}$ by selecting the resistor 34 to have a value $R_{TH}$ and with this resistor $R_{TH}$ in parallel with resistor 26 having a value equal to $R_F/3162$. Therefore, when there is no card in the reader and when switch 36 is closed, then $V_{OUT}=I_O \times R_F/3162$. If we also close the switch 38 when the switch 36 is closed, then the output voltage $V_{OUT}$ is also stored on the capacitor 32 as the threshold voltage. Therefore, as long as the values of the resistors 34 and 26 are maintained as above, then the threshold voltage stored on the capacitor 32 will be adapted to account for component tolerances and degradations.

In the actual use of the adaptive optical reader of FIG. 2, the switches 36 and 38 would be coupled together to be normally closed. The switches 36 and 38 would be opened only when the card 10 is inserted into the reader and with such insertion of the card 10 in the reader detected by a sensor 40. The sensor 40 is coupled to the switches 36 and 38 and controls the switches to be opened and closed as above. The threshold voltage across the capacitor 32 is therefore constantly adjusted to account for any initial component tolerances and any later changes due to component degradations.

Figure 3:
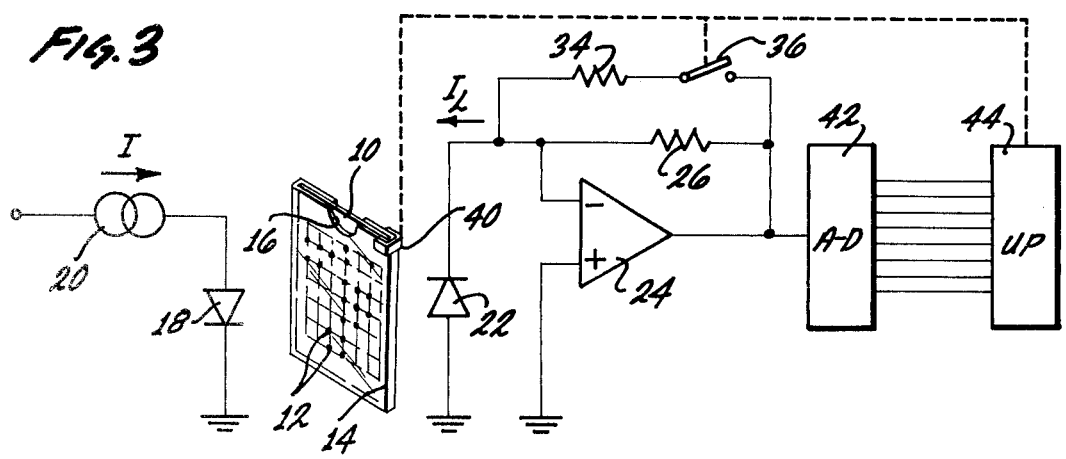
FIG. 3 illustrates a second embodiment of an adaptive threshold optical reader of the present invention using a digital storage incorporating a microprocessor for the adaptive threshold.

FIG. 3 illustrates an alternative method of storing the threshold voltage and elements substantially the same as those in FIG. 2 are given the same reference characters. In the system of FIG. 3, an analog-to-digital converter 42 and a microprocessor 44 are used to provide for the storage of the threshold voltage and to provide for the comparison of the stored threshold voltage with any encoded information later read from the card.

In FIG. 3 the current source 20 provides for energizing the LED light source 18 to produce light energy which is directed through the credit card 10 to be received and detected by the light sensor 22 such as a photodiode. The operational amplifier 24 has the resistors 26 and 34 across the input and output of the operational amplifier and with the switch 36 controlling when the resistor 34 is in circuit or not.

When no card is present within the card guide 14, the switch 36 is closed and the output voltage $V_{OUT}$ from the operational amplifier 24 is digitized by the analog-to-digital converter 42 and is then stored by the memory in the microprocessor 44. The relationship between the resistance values of the resistors 26 and 34 are as above so that the threshold value that is stored in the microprocessor 44 is constantly varied to accommodate tolerances and changes in the optical properties of the various components such as the light source 18, the card guide 14 and the light detector 22.

When a card is inserted into the card guide, the sensor mechanism 40 provides for the switch 36 to be opened and also for the microprocessor 44 to receive an input representative of a card being inserted into the reader. The microprocessor 44 now mathematically compares the stored threshold voltage with the output from the operational amplifier 24 to provide for the detection of the presence or absence of dots of optical information 12 on the card 10.

It is to be appreciated that the normal optical reader would provide for the reading of more than one track of information and in a particular example, the reader provides for reading multiple tracks and therefore includes multiple channels for processing the information. For example, using a system such as shown in FIG. 2, multiple identical individual channels may be used for processing the information. Using the system as shown in FIG. 3, the multiple analog outputs may be multiplexed into a single analog-to-digital converter and then to a single microprocessor. In addition, with the system such as shown in FIG. 3, it would be desirable to replace the switch 36 which is shown to be a mechanical switch with an electronic switch such as a field effect transistor (FET). A single channel configuration using such an electronic switch is shown in FIG. 4 and a microprocessor control configuration providing for the detection and control of multiple channels is shown in FIG. 5.

Figure 4:
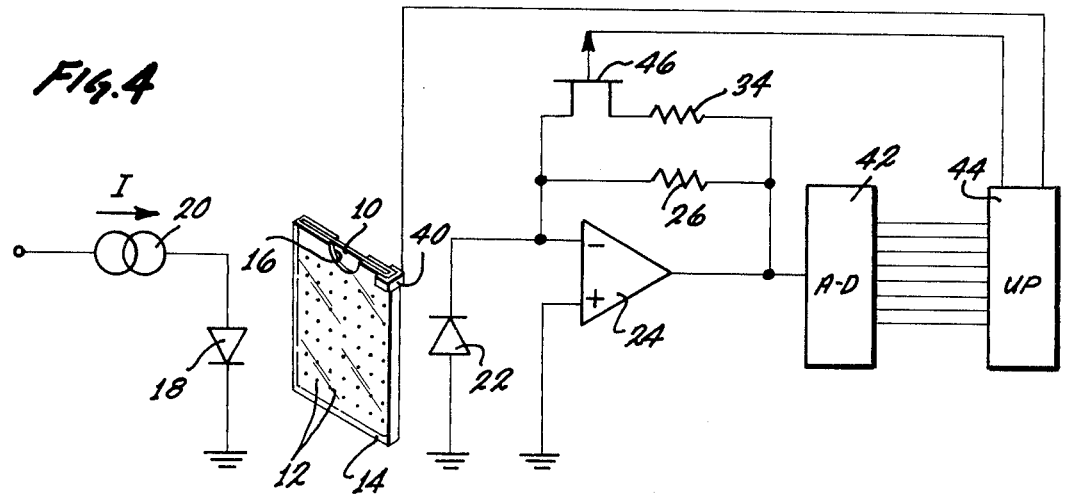
FIG. 4 illustrates a particular circuit configuration used for individual sensor channels for use with the microprocessor.

In FIG. 4, a single sensor channel is shown and with an FET switch 46 shown to be controlled by the microprocessor 44. In addition, the sensor 40 which provides for the detection of the presence of a card in the reader is used as an input to the microprocessor 44 and with the microprocessor 44 controlling the switch 46 in accordance with the presence or absence of a card in the reader.

FIG. 5 illustrates a block diagram of a system that can read multiple tracks of information on the card. Specifically, the card 10 and the card guide 14 are essentially similar to that shown above and includes multiple tracks of information 12. An emitter board 100 includes a plurality of light emitting diodes and specifically includes light emitting diodes to read information from the multiple channels of information. The sensor board 102 provides for light detectors to read the multiple tracks of information on an individual basis. The output from the sensor board 102 is shown as signals representative of multiple lines of information and is fed into the multiplexer 104.

The output from the multiplexer has the information representative of the plurality of different channels multiplexed to a single channel and is then applied to a sample and hold circuit 106. The output from the sample and hold is then digitized by an analog-to-digital converter 108. The output from the analog-to-digital converter 108 is in turn coupled to the microprocessor 110 for storage and handling. The microprocessor 110 additionally provides for output controls to the various other components of the system. For example, the emitter board 100 may be controlled to be on and off so that even though threshold levels may be monitored and stored in the microprocessor 110 during the periods when a card is not in the reader, the emitters do not have to be on all the time.

The sensor board 102 is also controlled by the microprocessor 110 to provide for the sensor to be in the proper mode. For example, each channel of the sensor board includes a switching circuit as shown in FIG. 4 so as to control the mode of operation of the sensor for each channel. In this way, the threshold level may be established and stored in the microprocessor 110 when there is no card in the reader but with the mode of operation of the sensors changed to provide for direct reading when a card is placed in the reader. The sensitivity of the reading, of course, occurs in accordance with the stored threshold level.

The microprocessor 110 also controls the multiplexer 104, the sample and hold circuit 106, and the analog-to-digital converter 108 so that the various devices are coordinated to provide for the proper reading of the optically encoded information.

The advantages of an adaptive threshold optical reader as shown in the present invention include the fact that the reader is generally insensitive to the light source and the light sensor component tolerances and is also insensitive to variations in the component values, to the degree that the ratio of resistances is maintained within allowable limits. As long as the components provide for some minimum output, this output may be used to provide for the reliable detection of the encoded optical information. In addition to the above advantages, the spacings of the emitter and sensor boards and the card guides are no longer critical and also any changes in the spacings or any deterioration in the optical path is no longer critical since the adaptive threshold reader system will compensate for these changes.

In the preferred embodiment of the invention, the threshold voltage cannot change during the length of the card read, since it is stored as a digital word in memory in a microprocessor. In the analog system, the voltage is stored as a charge on a capacitor and would be subject to some leakages that could affect, to a small degree, the threshold voltage. However, it is to be appreciated that any drop-off in the threshold during a read would be quite small and that the threshold is automatically checked and a new threshold restored after each card is read.

Other advantages in the use of a microprocessor are that the microprocessor may be programmed to detect if the threshold voltage drops too low such as due to severe component aging, dirt accumulation, defective components, etcetera. When this threshold voltage is too low to assure reliable reading of cards, the microprocessor may be programmed to indicate to peripheral equipment that the reader is either to be serviced or replaced.

FIG. 6 illustrates a system using a microprocessor substantially similar to that shown in FIG. 5. The system of FIG. 6 incorporates a feedback element as part of each sensor and with the feedback element forming a variable resistor. Elements in FIG. 6 which are substantially similar to those shown in FIGS. 1 through 5 are given the same reference characters.

In the third embodiment of FIG. 6, the plurality of light sources, such as the light emitting diodes 18, would together form the emitter board 100 as shown in FIG. 5. The particular number of light emitting diodes would depend upon the number of tracks to be read. Light energy from each light emitting diode is detected by the photodiodes 22 and the number of photodiodes would generally be complementary to the light emitting diodes.

In the configuration of the third embodiment of the invention shown in FIG. 6, both the light emitting diodes and photodetectors are shown to be always on but it is to be appreciated that either or both of these plurality of elements may be sequenced if desired.

In the embodiment of FIG. 6, each of the sensor channels includes an operational amplifier 24 connected in the same configuration as described above. However, in place of discrete resistors as described above, the embodiment of FIG. 6 includes a feedback element formed as a transistor 112 connected in the transdiode configuration. When in this configuration the transistor 112 operates as a variable resistor whose absolute value is a logarithmic function of the current flowing through the transistor such that an increasing current decreases the resistance value logarithmically.

Therefore, when there is no card in the reader, the output voltage from the operational amplifier 24 will have a value dependent upon the effective resistance value produced by the transistor 112 and with the current flowing through the transistor when there is no card 10 in the slot 16. The output voltage will also be dependent upon a constant which has a value in accordance with a number of parameters which affect the operation of the transistor. Generally, these various parameters do not change quickly and would not affect the output reading during the period of a card read.

The parameters may drift but the drift is over a relatively long time and if the threshold is updated on a periodic basis, the drift will not affect the output reading. This is because the same parameters will be present when the card 10 is inserted into the slot 16 so as to provide for an output reading of the information on the card. Since the same parameters are present for both a no-card reading and a reading with a card in the slot, the resultant constants substantially subtract from each other since the constant will affect equally both the threshold voltage and the card reading voltage.

When the card 10 is inserted into the slot, the light impinging on each photodiode 22 is affected as indicated above to thereby change the current flowing through each feedback transistor 112. This changes the feedback resistance in a logarithmic way, as indicated above, so that the output reading from the operational amplifier 24 may now be compared with the output reading just before the insertion of the card. The change in resistance value provided by the transistor 112 may therefore be thought of as substantially similar to the switching in and out of a resistor as shown in the previous embodiments of the invention.

The outputs from the different operational amplifiers representing the reading of the multiple tracks of information is fed into a multiplexer 104. The output from the multiplexer is coupled to the sample and hold circuit 106 and then passed on to the analog to digital converter 108. Finally, the microprocessor 110 receives the information from the analog to digital converter and also provides for output controls to the other components of the system. This structure is essentially similar to that shown in FIG. 5. It is also to be appreciated that a number of the components including the multiplexer 104, the sample and hold circuit 106 and the analog and digital converter 108 may all be part of the microprocessor and with the microprocessor programmed to provide for all of the above functions.

Although the invention has been described with reference to particular embodiments, it is to be appreciated that various adaptations and modifications may be made and the invention is only to be limited by the appended claims.

I claim:

1. An adaptive threshold optical reader for detecting optically encoded information when positioned within an optical path, including
    a light source for producing light energy along the optical path,
    a light detector responsive to the light energy along the optical path and for producing an output signal in accordance with the light energy detected by the light detector,
    means responsive to the output signal from the light detector and with the means having at least two states and with the means in a first state producing an adaptive threshold signal when there is no optically encoded information positioned within the optical path and with the adaptive threshold signal representative of the output signal from the light detector with a threshold level of optically encoded information and adaptive to optical changes and with the means in a second state for producing an information signal representative of the output signal from the light detector when there is optically encoded information positioned within the optical path,
    means responsive to the adaptive threshold signal for storing the adaptive threshold signal, and
    means responsive to the stored adaptive threshold signal and the information signal for detecting the presence of optically encoded information in the information signal above a threshold level in accordance with the stored adaptive threshold signal.

2. The adaptive threshold optical reader of claim 1 wherein the means for storing the threshold signal provides for the storage on an analog basis.

3. The adaptive threshold optical reader of claim 1 wherein the means for storing the threshold signal provides for the storage on a digital basis.

4. The adaptive threshold optical reader of claim 1 wherein the information signal normally includes a first level representative of no optically encoded information and a second level representative of optically encoded information and with the adaptive threshold signal having a level between the first and second levels for the information signal.

5. The adaptive threshold optical reader of claim 1 wherein the means responsive to the output signal from the light detector has the signals produced during the two states controlled in accordance with different fixed resistance values.

6. The adaptive threshold optical reader of claim 5 wherein the different fixed resistance values are controlled in accordance with the presence or absence of optically encoded information positioned within the optical path.

7. The adaptive threshold optical reader of claim 1 wherein the means responsive to the output signal from the light detector has the signals produced during the two states controlled in accordance with resistance values provided by a variable resistor.

8. The adaptive threshold optical reader of claim 7 wherein the variable resistor is formed by a transistor whose absolute value of resistance is a logarithmic function of the current flowing through the transistor.

9. An adaptive optical card reader for detecting information optically encoded on a card and with the card reader including a card guide to position the card within an optical path, including
    a light source for producing light energy along the optical path,
    a light detector for detecting the light energy along the optical path and for producing an output signal in accordance with the intensity of the detected light energy,
    means responsive to the output signal from the light detector for producing an adaptive threshold signal when there is no card positioned in the card guide and with the adaptive threshold signal having a level representative of a desired minimum threshold level for the detection of the optically encoded information and with the threshold signal adaptive to changes in the optical properties of the detector and with the means responsive to the output signal from the light detector for producing an information signal when there is a card positioned in the card guide and with the information signal representative of the optically encoded information, means responsive to the adaptive threshold signal for storing the threshold signal, and means responsive to the information signal and the stored adaptive threshold signal for comparing the information signal and the stored adaptive threshold signal for providing a detection of optically encoded information in accordance with such comparison.

10. The adaptive optical card reader of claim 9 wherein the means for storing the threshold signal provides for the storage on an analog basis.

11. The adaptive optical card reader of claim 9 wherein the means for storing the threshold signal provides for the storage on a digital basis.

12. The adaptive optical card reader of claim 9 wherein the information signal normally includes a first level representative of no optically encoded information and a second level representative of optically encoded information and with the adaptive threshold signal having a level between the first and second levels for the information signal.

13. The adaptive optical card reader of claim 9 wherein the means responsive to the output signal from the light detector has the signals produced in accordance with different fixed resistance values.

14. The adaptive optical card reader of claim 13 wherein the different fixed resistance values are controlled in accordance with the presence or absence of the card positioned in the card guide.

15. The adaptive card reader of claim 9 wherein the means responsive to the outlet signal from the light detector has the signals produced in accordance with resistance values provided by a variable resistor.

16. The adaptive optical card reader of claim 15 wherein the variable resistor is provided by a transistor whose absolute value is a logarithmic function of the current flowing through the transistor.

17. An adaptive threshold optical reader for detecting optically encoded information on a credit card, including a card guide for receiving the credit card and positioning the credit card within an optical path, a light emitting diode positioned on one side of the card guide for directing light energy along the optical path, a photodiode positioned to the other side of the card guide for receiving light energy directed along the optical path and for producing an output current in accordance with the intensity of the received light energy, an operational amplifier including a feedback resistance coupled to the photodiode and responsive to the output current for producing an output voltage in accordance with the output current and the value of the feedback resistance and with the feedback resistance having a first resistance value with no card in the card guide and a second resistance value with a card in the card guide, the output voltage with the feedback resistance having the second resistance value representative of the optically encoded information on the credit card and with the output voltage with the feedback resistance having the first resistance value representative of a threshold level for the detection of the optically encoded information, and means coupled to the operational amplifier and responsive to the output voltages with the feedback resistances having the first and second values for detecting the optically encoded information in accordance with the threshold level.

18. The adaptive threshold optical reader of claim 17 wherein the means coupled to the operational amplifier provides for the detection on an analog basis.

19. The adaptive threshold optical reader of claim 17 wherein the means coupled to the operational amplifier provides for the detection on a digital basis.

20. The adaptive threshold optical reader of claim 17 wherein the output voltage representative of the optically encoded information normally includes a first level representative of no optically encoded information and a second level representative of optically encoded information and with output voltage representative of the adaptive threshold having a level between the first and second levels for the optically encoded information.

21. The adaptive threshold optical reader of claim 17 wherein the feedback resistance is formed as a transistor in the transdiode configuration.

* * * * *